No. 609,328. Patented Aug. 16, 1898.
C. BLOCK.
HORSE COLLAR.
(Application filed Nov. 17, 1897.)
(No Model.) 2 Sheets—Sheet 1.
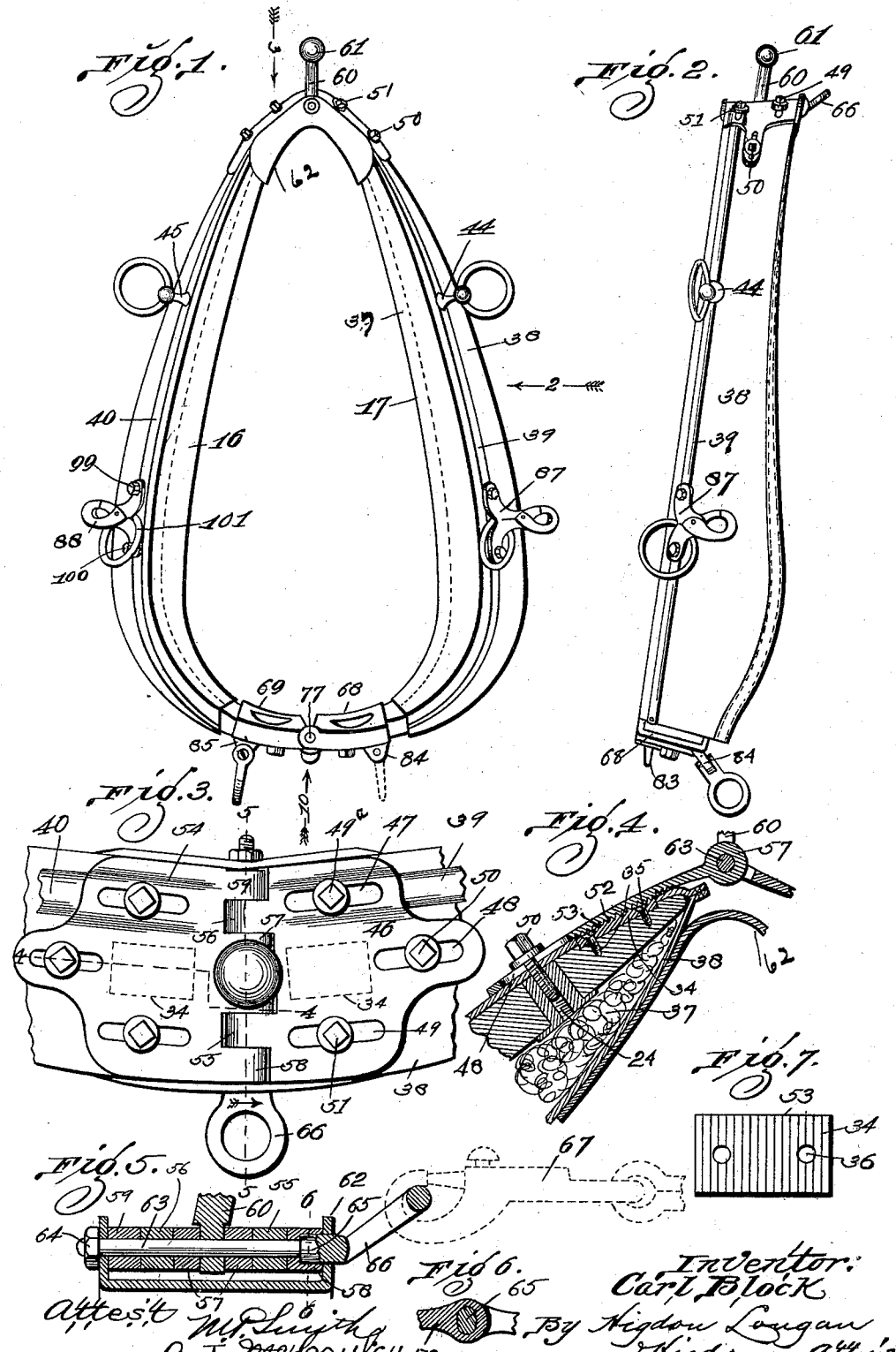

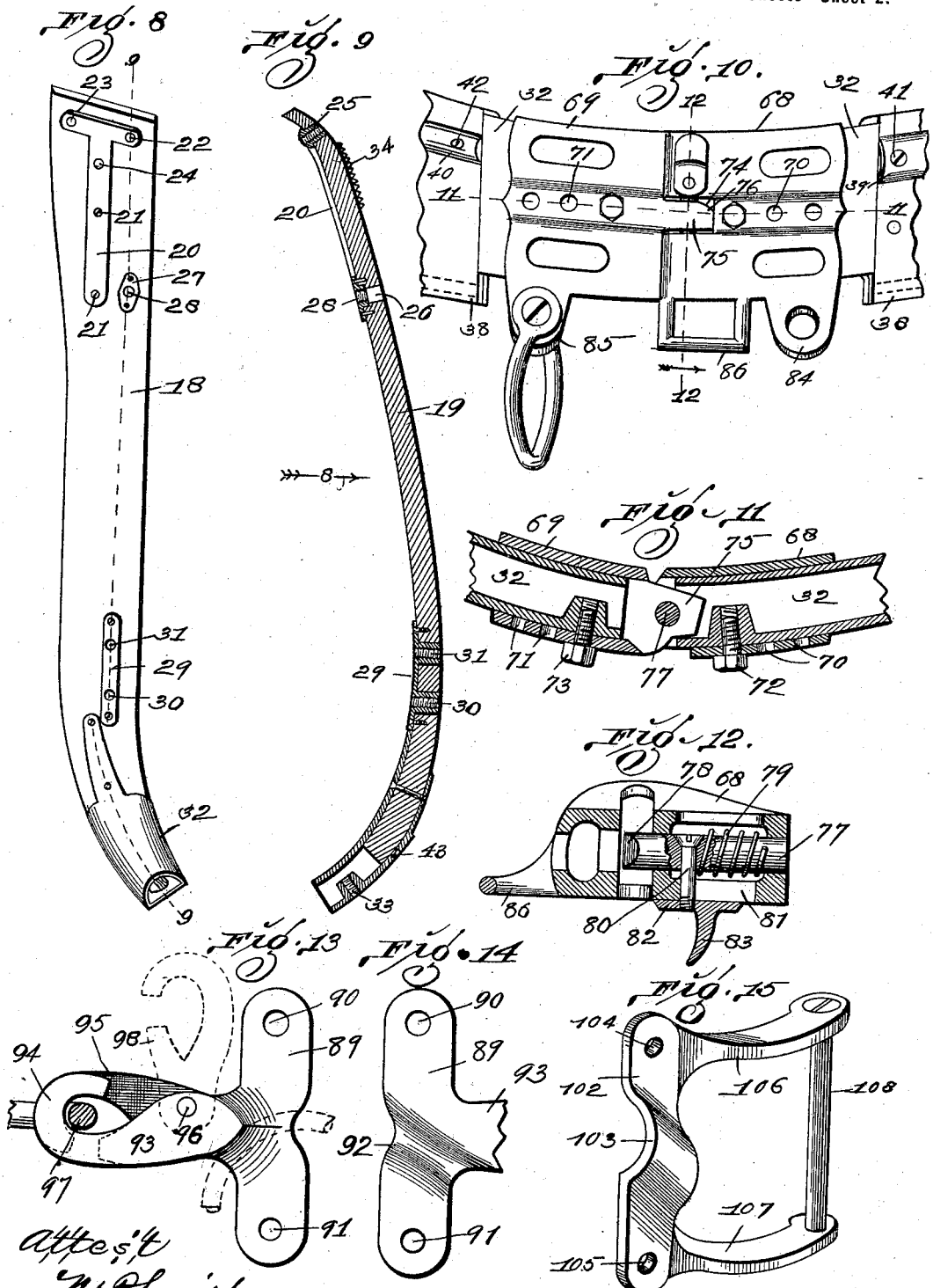

UNITED STATES PATENT OFFICE.

CARL BLOCK, OF ST. LOUIS, MISSOURI.

HORSE-COLLAR.

SPECIFICATION forming part of Letters Patent No. 609,328, dated August 16, 1898.

Application filed November 17, 1897. Serial No. 658,880. (No model.)

*To all whom it may concern:*

Be it known that I, CARL BLOCK, of the city of St. Louis, State of Missouri, have invented certain new and useful Improvements in Horse-Collars, of which the following is a full, clear, and exact description, reference being had to the accompanying drawings, forming a part hereof.

My invention relates to horse-collars; and it consists of the novel construction, combination, and arrangement of parts hereinafter shown, described, and claimed.

Figure 1 is a front elevation of my improved horse-collar. Fig. 2 is a side elevation taken looking in the direction indicated by the arrow 2 in Fig. 1. Fig. 3 is a plan view taken looking in the direction indicated by the arrow 3 in Fig. 1, parts being broken away. Fig. 4 is a vertical section taken approximately on the line 4 4 of Fig. 3. Fig. 5 is a sectional view taken approximately on the line 5 5 of Fig. 3. Fig. 6 is a section taken approximately on the line 6 6 of Fig. 5. Fig. 7 is a plan view of a corrugated plate which I employ. Fig. 8 is an inside elevation of one piece of the frame upon which the collar is built and taken looking in the direction indicated by the arrow 8 in Fig. 9. Fig. 9 is a section taken approximately on the line 9 9 of Fig. 8. Fig. 10 is a bottom plan view taken looking in the direction indicated by the arrow 10 in Fig. 1, parts being broken away to economize space. Fig. 11 is a section taken approximately on the line 11 11 of Fig. 10. Fig. 12 is a section taken approximately on the line 12 12 of Fig. 10 and looking in the direction indicated by the arrow. Fig. 13 is a front elevation of a trace-hook which I use in constructing my collar. Fig. 14 is a rear elevation of the part shown in Fig. 13, parts being broken away. Fig. 15 is a view in perspective of a modification of the construction shown in Figs. 13 and 14.

The collar consists of the side pieces 16 and 17, hinged together at their upper ends and removably latched together at their lower ends. With the exception of the latch mechanism at the lower ends of the side pieces 16 and 17, said side pieces are identical in construction, except that they are rights and lefts. In constructing the side piece 17 I employ the core 18, (shown in Figs. 8 and 9,) and the core consists of the wooden portion 19, which is curved to the desired shape and is somewhat wider at its upper end than at its lower end. The plate 20 is placed against the inner face of the upper end of the wooden portion 19 and is secured in position by means of the screws 21. The plate 20 is T-shaped in plan, as shown in Fig. 8, and the screw-threaded apertures 22, 23, and 24 are formed through said plate, said apertures being arranged in the form of a triangle relative to each other and there being corresponding apertures through the wooden portion 19, through which the lugs extend, said lugs being formed integral with the plate 20 and there being one of said lugs 25 for each of the apertures 23 and 24. An aperture 26 is formed through the wood portion 19 a short distance in front of the lower end of the plate 20, and a plate 27 is placed against the inner face of the wooden portion 19 and has a screw-threaded aperture 28 in alinement with the aperture 26. A plate 29 is placed against the inner face of the wood portion 19 near its lower end, and the screw-threaded lugs 30 and 31 extend through the wood portion 19 in vertical alinement with each other, said lugs being formed integral with the plate 29 and the apertures through said lugs extending through the plate 29.

The ferrule 32 is placed upon the lower end of the wood portion 19, said ferrule extending some distance below the lower end of the wood, and a screw-threaded aperture 33 is formed through the outer wall of the ferrule below the lower end of the wood. The corrugated plate 34 is placed against the outer face of the upper end of the wood portion 19 and secured in position by means of screws 35, inserted through the openings 36 into the wood.

The padding 37 is placed against the inner face of each of the cores 18, and the leather casing 38 is placed around the core and padding. The leather casing 38 is cut away, as required, to allow the teeth of the plate 34 to project outwardly through the casing, as shown in Fig. 4. The hames 39 and 40 are placed in position against the outer face of the casing 38, and the screws 41 and 42 are inserted through the lower ends of the hames and through the outer wall of the casings 38 and screw-seated in the apertures 33, formed in the ferrules 32 of the cores 18. The studs 44 and 45, carrying the line-rings, are inserted through the hames near their upper ends and screw-seated in the apertures 28 in the plates 27. The plate 46 has parallel slots 47, 48, and 49, and said plate is placed in position against the outer face of the upper end of the casing 38 of the side piece 17, and the bolt 49ª is inserted through the slot 47, then through the upper end of the hame 39, and screw-seated in the opening 22. The bolt 50 is inserted through the slot 48, then through the casing 38, and screw-seated in the opening 24, and the bolt 51 is inserted through the slot 49 and screw-seated in the opening 23. The inner face of the plate 46 is corrugated to form the teeth 52, which teeth engage the teeth 53 of the corrugated plate 34. By loosening the bolts 49ª, 50, and 51 the plate 46 may be adjusted up and down, and when the bolts are tightened the teeth 52 engage the teeth 53 to hold the plate firmly in position. The plate 54 is attached to the upper end of the side piece 16 in a manner identical with the means of attaching the plate 46 just described. The ears 55 and 56 extend from the upper edge of the plate 46, and the ear 57 extends from the upper edge of the plate 54 between said ears 55 and 56. The ears 58 and 59 extend from the upper edge of the plate 54 outside of the ears 55 and 56. The ear 57 is bifurcated, and the post 60 is inserted vertically into the slot formed by the bifurcation, the upper end of said post being ornamented by the ball 61 or any suitable device.

The sweat-leather 62 is placed against the inner faces of the upper ends of the side pieces 16 and 17 with its edges turned upwardly, and the hinge-pin 63 is inserted from the rear side through the sweat-leather, then through the ears 58 55 57 56 59 and then through the sweat-leather again, and the nut 64 is placed upon the forward end of the bolt to hold them in position. The head 65 of the bolt is oval in cross-section, as shown in Fig. 6, and fits within the aperture formed in the ear 58, corresponding to the head in shape, as required to prevent the hinge-pin from rotating. The loop 66 is formed integral with the head 65 and extends backwardly and upwardly at an angle of approximately forty-five degrees, said loop being designed to be engaged by the snap 67, (shown in dotted lines in Fig. 5,) said snap being attached to the back-strap of the harness. By fixing the hinge-pin 63 in such a way that it will not rotate the loop 66 is held rigidly in its normal position, thus holding the back-strap slightly elevated from the back of the animal, so that the snap 67 may readily be manipulated.

The cap 68 is placed upon the lower end of one of the ferrules 32, and a similar cap 69 is placed upon the lower end of the other one of the ferrules, said caps being of such a size and shape that they will readily slide upon the ferrules, and a series of apertures 70 is formed through the lower wall of the cap 68, and a similar series of apertures 71 is formed through the lower wall of the cap 69, said apertures being in alinement. A lag-screw 72 is inserted through one of the apertures 70 and screw-seated in the aperture 33 of one of the ferrules, and a similar lag-screw 73 is inserted through one of the apertures 71 and screw-seated in the aperture 33 of the other ferrule. The caps 68 and 69 are adjusted up and down on the ferrules by manipulating the lag-screws 72 and 73. A slot 74 is formed in the free edge of the socket 68, and a tongue 75 projects from the free edge of the cap 69 into said slot 74, the forward corner of said tongue being beveled, as indicated by 76. A spring-actuated sliding bolt 77 is mounted in the bearings formed in the front part of the cap 68 and extending in a line transversely of the slot 74, the end of said bolt being beveled, as indicated by 78, and an opening is formed transversely through the tongue 75 to receive the end of said bolt. The coil-spring 79 is mounted upon the bolt 77, the tension of said spring being exerted to hold the bolt in its normal position in the tongue 75. A screw 80 is inserted through the bolt 77 and through the aperture 81, formed in the cap 68 and screw-seated in the plate 82, which plate slidingly engages the front face of the cap 68, and an ear 83 projects downwardly from the plate 82 for operating the same.

When the collar has been placed in position and it is desired to latch the lower ends of the portions 16 and 17 together, the end of the tongue 75 is inserted in the slot 74 and the beveled face 76 engages the beveled face 78, thus forcing the bolt 77 outwardly against the tension of the spring 79 until the tongue 75 is brought into position for the bolt 77 to enter the opening through the tongue 75 when the bolt is inserted into said opening by the tension of said spring and the collar is securely latched in position.

An ear 84 extends downwardly and backwardly from the cap 68, and a similar ear 85 extends downwardly and backwardly from the cap 69. Rings are attached to the ears 84 and 85.

A rectangular loop 86 projects downwardly from the cap 68, said loop being located between the ears 84 and 85. The trace-hooks 87 and 88 are attached to the hames 39 and 40, said trace-hooks being identical in construction, except that they are rights and lefts, and they are constructed as shown in detail in Figs. 13 and 14. The plate 89 has vertically-alined apertures 90 and 91 in its ends and a recess running diagonally across its inner face. An arm 93 projects backwardly from the center of the plate 89, the rear end of said arm being turned upwardly and forming the hook 94. The hook 95 is pivotally attached to the arm 93 by means of the pivot 96, said hook 95 turning downwardly inside of the hook 94 and leaving the opening 97 for the cockeye to operate in. An arm 98 (shown in dotted lines) extends backwardly from the forward end of the hook 95 to a point substantially in vertical alinement with the upper end of the hook 94. When the cockeye is in position engaging both of the hooks 94 and 95, it cannot be unhooked without first raising the hook 95. The bolts 99 and 100 are placed in position through the openings 90 and 91. The ring 101 is placed in position in the recess 92, and the bolts 99 and 100 are inserted through the hame and screw-seated in the apertures 30 and 31, thus holding the hooks securely in position.

If it is desired to attach the tugs permanently to the collar, the device shown in Fig. 15 may be substituted for the hooks shown in Figs. 13 and 14, and said device consists of the plate 102, having the recess 103 in its rear face and having apertures 104 and 105 in its ends, said plate being placed in position against the hame and secured in position by means of the bolts 99 and 100, and the arms 106 and 107 project backwardly from the ends of the plate. The tug is placed between the rear ends of said arms, and the pin 108 is inserted through the arms and through the tug. The operation is obvious.

I claim—

1. In a horse-collar, a pair of rigid cores, each comprising the bent-wood portion 19, the plate 20 secured to the inner side of the upper end of the wood portion and provided with suitably-located integral lugs, which lugs pass through the wood portion and are provided with screw-threaded apertures in which are located the screws that hold the hinged plates that connect the upper ends of the cores, the plate 27 secured to the inner face of the wood portion below the lower end of the first-mentioned plate and provided with an integral lug through which passes a screw-threaded aperture and in which is located the shank of the line-ring, the ferrule 32 located upon the lower end of the wood portion and provided with suitably-located screw-threaded apertures, the plate 29 located upon the inner face of the wood portion and provided with suitably-located screw-threaded apertures, in which apertures are located the screws that hold the trace-hook, casings inclosing said cores, and means whereby the lower ends of the cores are held together, substantially as specified.

2. A horse-collar, constructed with suitable rigid cores, suitable casings for said cores, packing within said casings around said cores, an adjustable hinge connecting the upper ends of said cores, a separable adjustable latch connecting the lower ends of said cores, the hames 39 and 40 located upon the outside of the casings upon said cores, and the trace-hooks 87 and 88, the fastening-screws of which trace-hooks pass through the hames and into the cores, substantially as specified.

In testimony whereof I affix my signature in presence of two witnesses.

CARL BLOCK.

Witnesses:
ALBERT J. MCCAULEY,
JOHN C. HIGDON.